United States Patent
Lee et al.

(10) Patent No.: US 9,874,258 B2
(45) Date of Patent: Jan. 23, 2018

(54) ELECTROMECHANICAL BRAKE CAPABLE OF AUTOMATICALLY RELEASING PARKING BRAKING

(71) Applicant: Hyundai Motor Company, Seoul (KR)

(72) Inventors: Joung Hee Lee, Gyeonggi-do (KR); Jong Yun Jeong, Gyeonggi-do (KR); Dong Yoon Hyun, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/364,238

(22) Filed: Nov. 29, 2016

(65) Prior Publication Data

US 2017/0328430 A1  Nov. 16, 2017

(30) Foreign Application Priority Data

May 10, 2016 (KR) .................. 10-2016-0056947

(51) Int. Cl.
*F16D 65/18* (2006.01)
*F16D 121/24* (2012.01)
*F16D 125/48* (2012.01)

(52) U.S. Cl.
CPC .......... *F16D 65/18* (2013.01); *F16D 2121/24* (2013.01); *F16D 2125/48* (2013.01)

(58) Field of Classification Search
CPC .. F16D 55/224; F16D 63/006; F16D 65/0006; F16D 65/18; B60T 1/005
USPC .... 188/2 D, 156–164, 265; 192/219.4, 219.5
See application file for complete search history.

(56) References Cited

U.S. PATENT DOCUMENTS

| 7,299,905 | B2* | 11/2007 | Yamaguchi | B60T 13/02 188/156 |
| 7,828,124 | B2* | 11/2010 | Sano | B60T 1/005 188/156 |
| 8,387,759 | B2* | 3/2013 | Prix | F16H 63/3416 188/265 |
| 2008/0264740 | A1* | 10/2008 | Usui | F16D 65/18 188/73.31 |
| 2010/0051395 | A1* | 3/2010 | Sano | B60T 1/005 188/162 |
| 2011/0290615 | A1* | 12/2011 | Schwekutsch | F16H 63/3416 192/219.5 |
| 2014/0216885 | A1* | 8/2014 | Heuver | B60T 1/005 192/219.4 |
| 2016/0017942 | A1* | 1/2016 | Kwon | F16D 65/18 188/162 |

(Continued)

FOREIGN PATENT DOCUMENTS

JP  2006-183809 A  7/2006
JP  2008-128444 A  6/2008

(Continued)

*Primary Examiner* — Christopher Schwartz
(74) *Attorney, Agent, or Firm* — Mintz Levin Cohn Ferris Glovsky and Popeo, P.C.; Peter F. Corless

(57) ABSTRACT

An electromechanical brake integrates a function of a parking brake by adding a simple structure to an existing electromechanical brake. In particular, the electromechanical brake includes a parking braking releasing structure configured to automatically release parking braking after a parking brake operates. In addition, the electromechanical brake is implemented to perform and release parking braking by using a drive unit which may operate in a single direction instead of using a drive unit which may operate in two directions.

18 Claims, 8 Drawing Sheets

(56) References Cited

U.S. PATENT DOCUMENTS

2016/0082933 A1* 3/2016 Iwata ................. B60T 1/005
                                                                188/163
2017/0114848 A1* 4/2017 Park .................. B60T 1/005

FOREIGN PATENT DOCUMENTS

| JP | 2011-074946 A | 4/2011 |
| JP | 5088502 B2 | 12/2012 |
| KR | 2010-0030285 A | 3/2010 |
| KR | 10-1511437 B1 | 4/2015 |

* cited by examiner

ELECTROMECHANICAL BRAKE CAPABLE OF AUTOMATICALLY RELEASING PARKING BRAKING

CROSS-REFERENCE TO RELATED APPLICATION

This application claims under 35 U.S.C. §119(a) the benefit of Korean Patent Application No. 10-2016-0056947 filed on May 10, 2016, the entire contents of which are incorporated herein by reference.

BACKGROUND (a) Technical Field

The present invention relates to an electromechanical brake, more particularly, to an electromechanical brake having a structure capable of performing parking braking.

(b) Description of the Related Art

In general, an electromechanical brake (EMB) has a higher response speed than a hydraulic brake, and may be precisely controlled, and thus the electromechanical brake may improve braking safety performance, and is essentially used for brake-by-wire.

The electromechanical brake produces braking force by operating a motor and mechanically transmitting the rotational force of the motor. The electromechanical brake such as an electric parking brake (EPB) has been widely applied to a vehicle, and a field of the electromechanical brake has been expanded because of the development of the electromechanical brake used for a main brake, which is substituted for a hydraulic brake in the related art.

In particular, an electromechanical brake in which a function of an electric parking brake is integrated has been developed, but there are problems in that because functions of the two brakes are integrated, a size of the brake is increased, a structure of the brake is complicated, and as a result, vehicle mountability deteriorates.

The above information disclosed in this Background section is only for enhancement of understanding of the background of the invention and therefore it may contain information that does not form the prior art that is already known in this country to a person of ordinary skill in the art.

SUMMARY

The present invention provides an electromechanical brake in which a function of an electric parking brake is integrated by using a simple operational structure.

In one aspect, the present invention provides an electromechanical brake capable of automatically releasing parking braking, the electromechanical brake including: a motor unit which rotates a driving shaft; a braking unit which produces braking force or cuts off the braking force in accordance with the rotation of the driving shaft; a parking drive unit which operates a driving rod; a parking rod which is hingedly coupled to the driving rod and has a slot; a guide pin which is inserted into the slot of the parking rod and fixed to a housing; and a parking ring which is installed on the driving shaft and has catching portions radially formed thereon.

In a preferred embodiment, the catching portions may be protrusions formed radially.

In another preferred embodiment, each of the protrusions may have a serrated shape having a support surface and a pressing surface, and the pressing surface may have a larger area than the support surface.

In still another preferred embodiment, the catching portions may have the same shape and size.

In yet another preferred embodiment, the slot may have a track shape.

In still yet another preferred embodiment, the guide pin may have a circular cross section, and a width of the slot may be set such that the guide pin is not moved in a transverse direction.

In a further preferred embodiment, the parking rod may have an upper end surface which comes into contact with the support surface of the parking ring, and a lateral surface which comes into contact with the pressing surface.

In another further preferred embodiment, the parking rod may restrict a rotation of the parking ring by being supported by the guide pin at the time of performing parking braking.

In still another further preferred embodiment, the electromechanical brake may further include a return spring which provides restoring force for moving the parking rod and the driving rod to releasing positions at the time of releasing parking braking.

In yet another further preferred embodiment, the return spring may be mounted in the parking drive unit.

In still yet another further preferred embodiment, the parking rod may restrict a rotation of the parking ring by being supported by the guide pin in a state in which the support surface is in contact with the upper end surface of the parking rod at the time of performing parking braking.

In a still further preferred embodiment, the pressing surface may push away the lateral surface of the parking rod so as to move the parking rod and the driving rod to the releasing positions at the time of releasing parking braking.

In a yet still further preferred embodiment, the electromechanical brake may further include a control unit which controls the motor unit and the parking drive unit.

In a yet still further preferred embodiment, the control unit may rotate the motor unit in a releasing direction when the parking drive unit moves the parking rod and the driving rod to braking positions.

In a yet still further preferred embodiment, the control unit may rotate the motor unit in a pressing direction at the time of releasing parking braking.

In a yet still further preferred embodiment, the parking drive unit may be a solenoid which moves the driving rod in a single direction.

In a yet still further preferred embodiment, the electromechanical brake may further include: a driving gear which is installed on the driving shaft; and a reduction gear unit which is connected with the driving gear.

In a yet still further preferred embodiment, the parking rod, which is moved to the braking position by the parking drive unit, may restrict a rotation of the parking ring by coming into contact with the catching portion of the parking ring.

According to the present invention, it is possible to implement a parking brake system even by using a small-sized solenoid that operates in a single direction, and as a result, a size of the parking brake system may be decreased, and costs required to manufacture the parking brake system may be reduced.

A loss of parking force may be structurally inhibited, thereby improving system durability.

The electromechanical brake may operate by additionally applying only a small-sized solenoid, and almost no operational noise is generated during a process in which the parking ring and the parking rod continuously come into contact with each other, thereby improving noise reducing properties.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
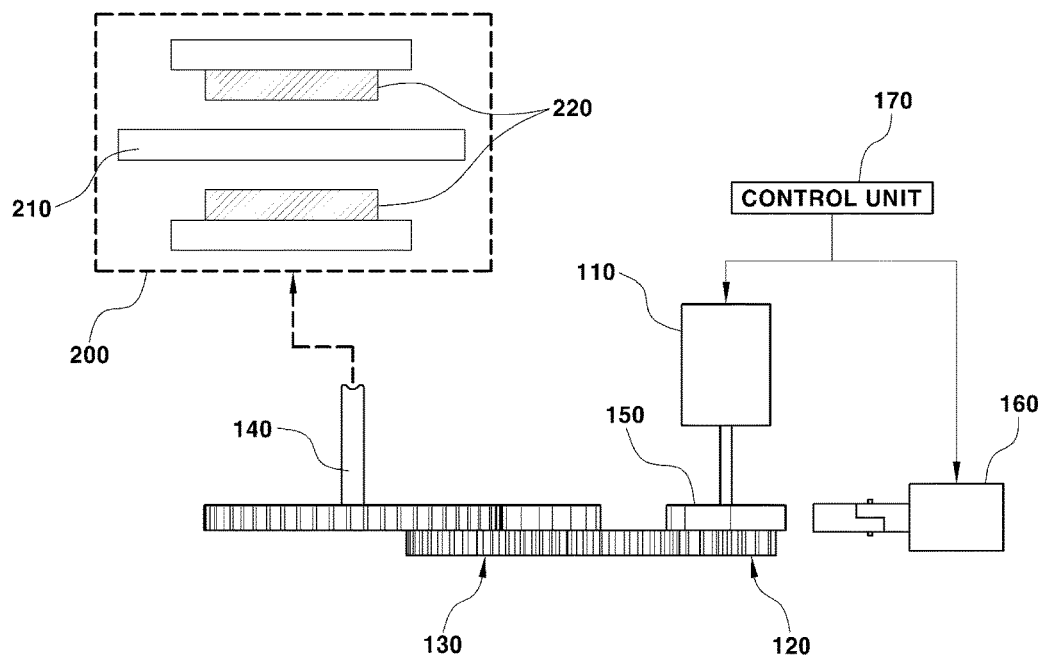
FIG. 1 is a view schematically illustrating an entire configuration of an electromechanical brake according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides an electromechanical brake in which a function of a parking brake is integrated by adding a simple structure to an existing electromechanical brake. In particular, the present invention includes a parking braking releasing structure configured to automatically release parking braking after a parking brake operates. In addition, the present invention is implemented to perform and release parking braking by using a drive unit which may operate in a single direction instead of using a drive unit which may operate in two directions.

Hereinafter, an electromechanical brake capable of automatically releasing parking braking according to an exemplary embodiment of the present invention will be described in detail with reference to the accompanying drawings.

FIG. 1 is a view schematically illustrating an entire configuration of the electromechanical brake according to the exemplary embodiment of the present invention.

As illustrated in FIG. 1, the electromechanical brake according to the exemplary embodiment of the present invention includes a motor unit 110, a driving gear 120 which is connected to a driving shaft of the motor unit 110, a reduction gear unit 130 which is connected to the driving gear 120, and a braking unit 200 which is operated by a spindle 140 connected to the reduction gear unit 130. All or at least some of these components may be mounted in a housing 300 (see, e.g., FIG. 2).

Specifically, the present exemplary embodiment includes the motor unit 110 for providing braking force for performing braking, and a parking drive unit 160 which is operated to support braking force at the time of performing parking braking. In addition, the motor unit 110 and the parking drive unit 160 are operated by an operation command from a control unit 170. In the present invention, the motor unit 110 may be configured to be rotatable in two directions in order to provide braking force and eliminate braking force. Further, in the present invention, the parking drive unit 160 may be configured to provide driving power only in a single direction. Of course, a parking drive unit that provides driving power in two directions is conceivable, but providing the driving power only in the single direction is sufficient because of the nature of a parking mechanism, and as a result, the parking drive unit 160, which provides driving power in the single direction, may be adopted in consideration of a size and manufacturing costs of the electromechanical brake.

The motor unit 110 is configured to be operated by being supplied with electric power from a driving power source such as a battery in accordance with an operation command from the control unit 170. The driving gear 120 is mounted on the driving shaft of the motor unit 110, and the driving gear 120 is configured to transmit rotational force, which is provided by the motor unit 110, to the spindle 140 for operating the braking unit 200. In particular, the driving gear 120 is connected to the reduction gear unit 130, and rotational force of the motor unit 110 is transmitted through the reduction gear unit 130, such that the spindle 140 is rotated. The reduction gear unit 130 is a component for slowing down the rotation of the driving shaft by the drive motor to an appropriate level, and may be configured by combining a plurality of gears.

The spindle 140 rotates to allow the braking unit 200 to produce braking force, and particularly, the spindle 140 may be configured in the form of a ball screw or a typical screw. The braking unit 200 includes brake pads 220 and a disc 210, and is configured such that a movable member (not illustrated) thread-coupled to the spindle 140 presses the brake pads 220 against the disc 210 while moving.

According to a braking operation of the electromechanical brake according to the present invention, at the time of performing braking, when the control unit 170 receives a driver's intention of braking the vehicle, the control unit 170 allows the driving power source such as a battery to apply electric power to the motor unit 110, such that the motor is operated, and the braking is started. When electric power is applied to the motor unit 110 and the driving shaft is rotated in a forward direction, the driving gear 120 connected to the motor unit 110 is rotated, and rotates the spindle 140 via the reduction gear unit 130.

The rotational motion of the spindle 140 is converted into rectilinear motion through a structure such as a ball screw, and thus the brake pads 220 are pressed against the disc 210 so as to perform the braking.

Meanwhile, at the time of releasing the braking, the motor unit 110 is rotated in a reverse direction opposite to the aforementioned forward direction. For example, on the assumption that the forward direction is a clockwise direction, the driving shaft is rotated counterclockwise so as to release the braking.

At the time of releasing the braking, the same process of transmitting driving power of the motor to the braking unit 200 via the spindle 140 is carried out, but because the motor is rotated in the opposite direction, the brake pads 220 are not pressed against the disc 210, but move in a direction to which the braking force is released, that is, a direction in which the brake pads 220 move away from the disc 210.

Meanwhile, a structure capable of automatically releasing parking braking, in the electromechanical brake according to the exemplary embodiment of the present invention, will be described in detail with reference to FIGS. 2 to 4.

Figure 2:
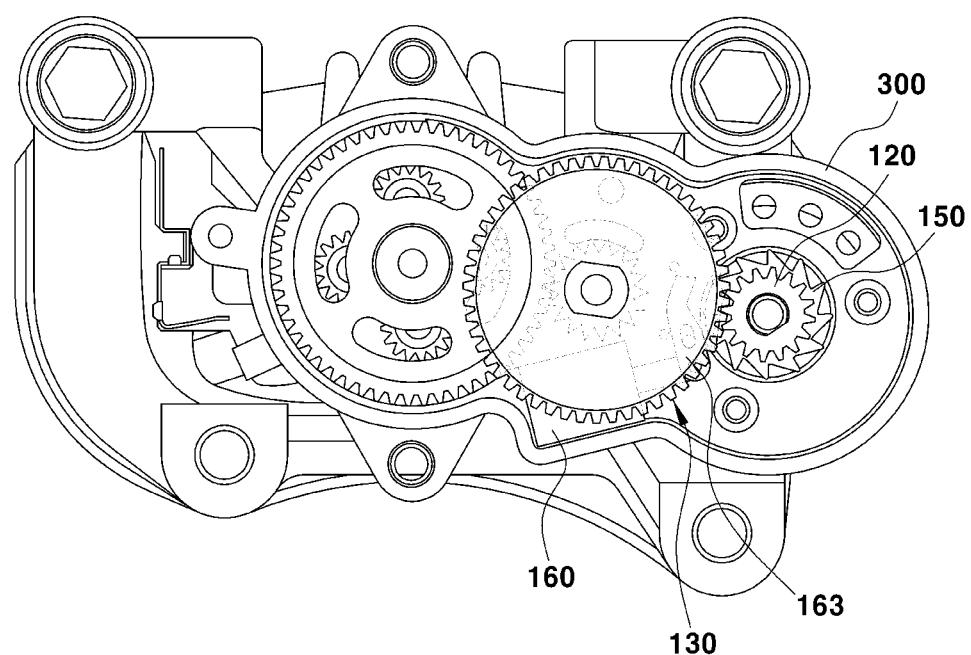
FIG. 2 is a view illustrating an internal configuration of the electromechanical brake according to the exemplary embodiment of the present invention.
Figure 3A:
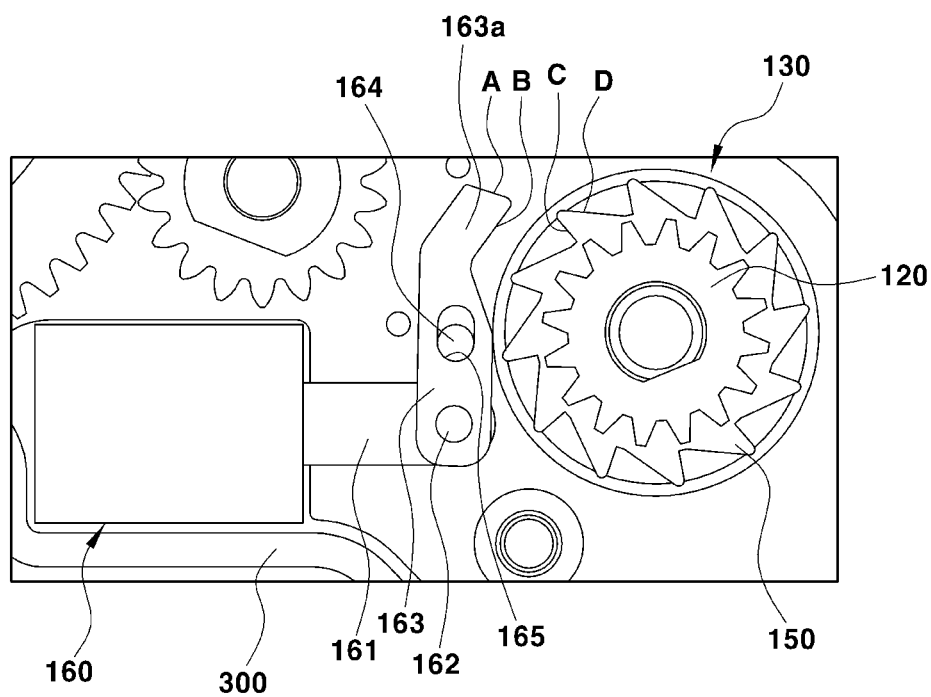
FIGS. 3A to 3C are views sequentially illustrating states in which the electromechanical brake according to the exemplary embodiment of the present invention operates at the time of performing parking braking.

FIG. 2 is a view illustrating an internal configuration of the electromechanical brake according to the exemplary embodiment of the present invention. FIGS. 3A to 3C and FIGS. 4A to 4C are enlarged views of a part in FIG. 2, in which FIGS. 3A-3C sequentially illustrate states in which the electromechanical brake operates at the time of performing parking braking, and FIGS. 4A-4C sequentially illustrate states in which the electromechanical brake operates at the time of releasing parking braking. In particular, FIG. 3C illustrates a state in which the parking braking is completely performed, and FIG. 3A illustrates a state in which the parking braking is completely released. For convenience of description, positions of components in FIG. 3C are referred to as parking positions, and positions of the components in FIG. 3A are referred to as releasing positions.

The electromechanical brake according to the exemplary embodiment of the present invention has a structure in which rotation of a parking ring 150 connected to the driving shaft of the motor may be inhibited by the parking drive unit 160 which operates in a single direction.

As illustrated in FIG. 2, the driving gear 120 and the reduction gear unit 130 are accommodated in the housing 300. The driving gear 120 is mounted on the driving shaft of the motor unit 110, and the parking ring 150 is additionally mounted on the driving shaft. The parking ring 150 is structured such that the rotation of the parking ring 150 may be restricted by a parking rod 163 of the parking drive unit 160.

The parking drive unit 160 is configured to perform and release parking braking, and may be configured as a unidirectional solenoid that may operate the driving rod 161 in a single direction. The solenoid is used to move the driving rod 161 so as to maintain the applied braking force and prevent the braking force from being eliminated. Therefore, the solenoid includes the driving rod 161 which is moved in a single direction by being supplied with electric power, and particularly, further includes a return spring for providing restoring force for allowing the driving rod 161 to return back to an initial position. In particular, according to the exemplary embodiment of the present invention, parking braking may be released just by the movement of the motor unit 110 for releasing the braking, that is, by rotating the motor unit 110 in a releasing direction without applying separate force for releasing the parking braking. Therefore, when the motor unit 110 is rotated in the releasing direction, the parking rod 163 and the driving rod 161 may be automatically moved to a position for releasing braking by using restoring force of the return spring.

The parking rod 163 is hingedly coupled to the driving rod 161 by means of a hinge portion 162, and has a slot 165 formed at a center thereof. Meanwhile, a guide pin 164 is formed on a bottom surface of the housing 300 or other members to which the guide pin 164 may be fixed, and the guide pin 164 is inserted into the slot 165. When the parking drive unit 160 is operated, the parking rod 163 comes into contact with the parking ring 150 so as to restrict the rotation of the parking ring 150, and the guide pin 164 is inserted into the slot 165 so as to guide the movement of the parking rod 163.

The slot 165 has a sufficiently larger size than the guide pin 164 so that the guide pin 164 may be moved in the slot 165. In particular, the guide pin 164 has a circular cross section, and the slot 165 may be configured to have a track shape having a width approximately identical to a diameter of the guide pin 164 (actually a width slightly larger than a diameter of the guide pin 164). Here, a width of the track shape means a portion having a relatively short length (width). The track-shaped slot 165 is sized to sufficiently receive the movement of the driving rod 161, and the driving rod 161 may be operated once as the guide pin 164 is positioned at both end portions in a longitudinal direction of the slot 165.

Figure 3B:
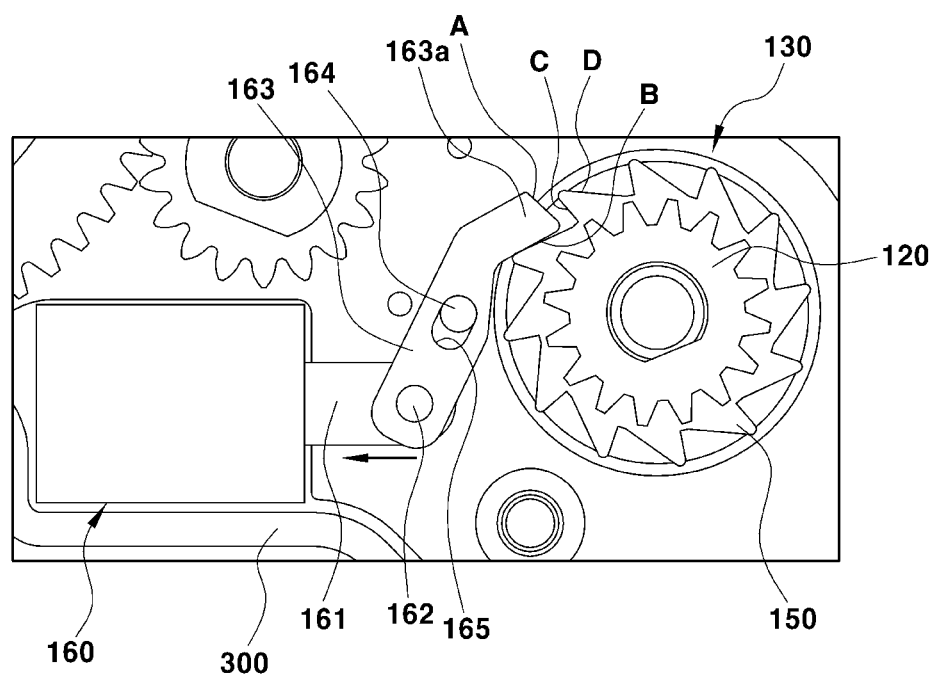
Figure 3C:
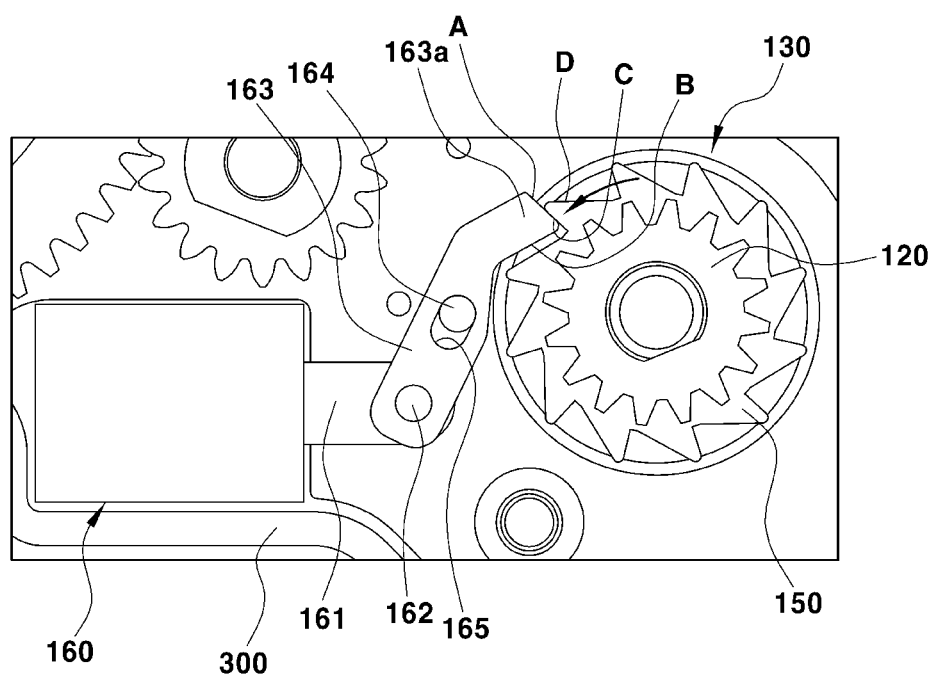

That is, as illustrated in FIGS. 3A to 3C, when the driving rod 161 is at a first position (at a point where the driving rod 161 is extended farthest from the solenoid) (see FIG. 3A), the guide pin 164 is positioned at a first end portion in the longitudinal direction of the slot 165, and when the driving rod 161 is at a second position (at a position where the driving rod 161 is retracted closest to the solenoid) (see FIG. 3C), the guide pin 164 is positioned at a second end portion in the longitudinal direction of the slot 165.

The parking rod 163 needs to be formed to restrict the rotation of the parking ring 150. To this end, the parking rod 163 is structured to come into contact with a protrusion of the parking ring 150 and restrict the rotation of the parking ring 150. For example, as illustrated in FIG. 3A, the parking rod 163 may be configured to have a finger portion 163a which is bent toward the parking rod 163 at an end portion opposite to the hinge portion 162 connected with the driving rod 161. The bent shape of the finger portion 163a may improve contact and support properties with the parking ring 150. In particular, excellent restrictive force may be provided at the time of performing and releasing parking braking, and thus an advantage in terms of a layout is provided when the components such as the parking drive unit 160 and the driving rod 161 are installed.

In this exemplary embodiment, the parking rod 163 has an upper end surface A which comes into contact with the protrusion of the parking ring 150 so as to support the parking ring 150. The upper end surface A may be formed as a quadrangular flat structure.

The parking rod 163 is configured to move to a releasing position by being pushed by the protrusion of the parking ring 150 at the time of releasing the parking braking. To this end, the parking rod 163 has a lateral surface B which extends from one end portion of the upper end surface A so that the parking rod 163 may be pushed away while coming into contact with the protrusion of the parking ring 150. Like the upper end surface A, the lateral surface B may also include a quadrangular flat structure.

Meanwhile, the parking ring 150, which operates in conjunction with the parking rod 163, has a catching structure in which the parking rod 163 may come into contact with the parking ring 150 so as to restrict the rotation of the driving shaft. Therefore, in the present invention, the parking ring 150 may be variously implemented as long as the parking ring 150 has a structure in which the parking ring 150 is caught by the parking rod 163 and the rotation of the parking ring 150 is restricted. For example, the parking ring 150 may be structured to have a circular body with a groove formed therein, and particularly, may be structured to have outwardly protruding protrusions as illustrated in FIG. 2.

As provided herein, the catching structure of the parking ring 150 is referred to collectively as a catching portion, and hereinafter, an example in which the catching portion is implemented in the form of a protrusion will be described.

The parking ring 150 has a plurality of protrusions and is mounted on the driving shaft. The parking ring 150 is rotated together with the driving shaft of the motor unit 110. The protrusions of the parking ring 150 are radially disposed on a ring-shaped circular body, and particularly, configured as a plurality of protrusions having the same size and shape which covers regions equally divided, respectively.

According to the exemplary embodiment of the present invention, the protrusion is formed with a support surface C having a relatively small area, and a pressing surface D having a relatively large area. The support surface C is a surface approximately directed toward a center of the parking ring 150, and the pressing surface D defines a surface that abuts the circular body of the parking ring 150. Therefore, as illustrated in FIG. 2, the protrusions have a plurality of serrated structures radially disposed on the circular body. Meanwhile, in FIG. 1, the parking ring 150 is illustrated as being mounted at a lower side of the driving gear 120, that is, at a side close to the motor, but a relative mounting position may be changed.

The operations of the configurations at the time of performing the parking braking and at the time of releasing the parking braking will be specifically described.

First, FIGS. 3A to 3C specifically illustrate the operations at the time of performing the parking braking. Meanwhile, since sufficient braking force needs to be produced between the disc 210 and the pads in order to perform the parking braking, it is based upon the premise that the motor unit 110 is being operated by the control unit 170.

As illustrated in FIG. 3A, in a state in which the parking braking is not performed, the driving rod 161 is positioned at the first position, and by the guide pin 164 and the slot 165, the parking rod 163 is positioned at the releasing position, that is, positioned so that the upper end surface A is directed upward so as not to restrict the parking ring.

Next, when the control unit 170 operates the parking drive unit 160 (i.e., the solenoid), the driving rod 161 is moved toward the second position, and thus the parking rod 163 is also moved toward the parking ring 150.

As the driving rod 161 is moved to the second position by the parking drive unit 160, the parking rod 163 is moved to the position sufficient to restrict the parking ring 150 as illustrated in FIG. 3B.

In this case, as illustrated in FIG. 3B, the parking ring 150 is required to be rotated in order to compensate for a clearance between the support surface C of the protrusion of the parking ring 150 and the upper end surface A of the parking rod 163.

Therefore, when the operation of the parking drive unit 160 is completed, the control unit 170 operates the motor unit 110 so that the parking ring 150 is rotated in a releasing direction (i.e., counterclockwise in FIG. 3C). When the parking ring 150 is sufficiently rotated, the support surface C of the protrusion of the parking ring 150 comes into contact with the upper end surface A of the parking rod 163. In this case, as illustrated in FIG. 3C, since the parking rod 163 is supported by the guide pin 164 in the slot 165, the parking rod 163 may restrict the rotation of the parking ring 150.

Therefore, as illustrated in FIG. 3C, the parking ring 150 cannot be rotated as the parking rod 163 supports the protrusion of the parking ring 150, and therefore, the driving shaft cannot be rotated counterclockwise. Since the counterclockwise direction of the driving shaft means the releasing direction on the disc, the electromechanical brake may maintain the braking state, and thus the parking brake is in a state of being operated.

Figure 4A:
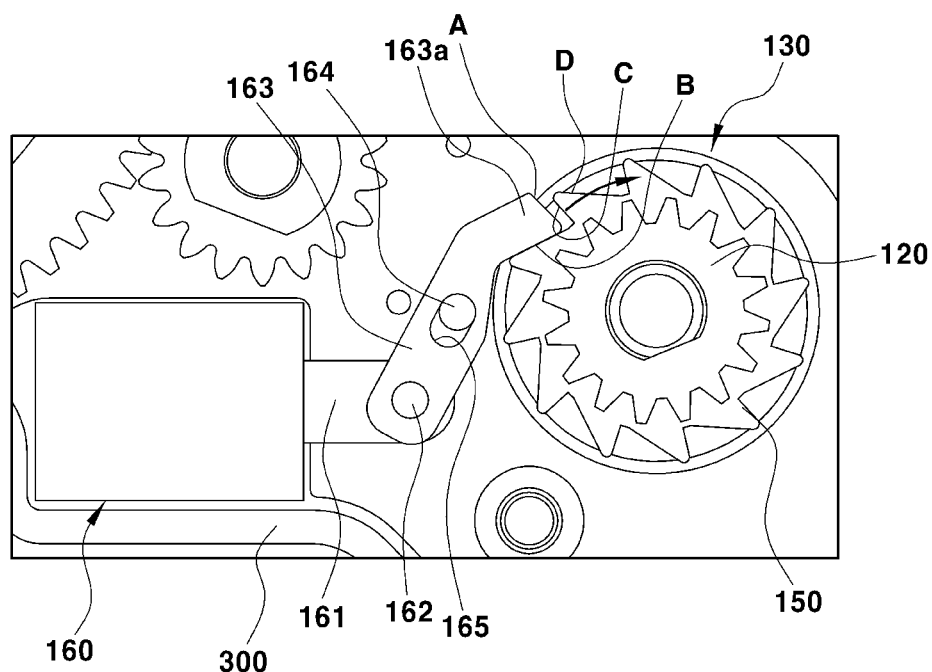
FIGS. 4A to 4C are views sequentially illustrating states in which the electromechanical brake according to the exemplary embodiment of the present invention operates at the time of releasing parking braking.
Figure 4B:
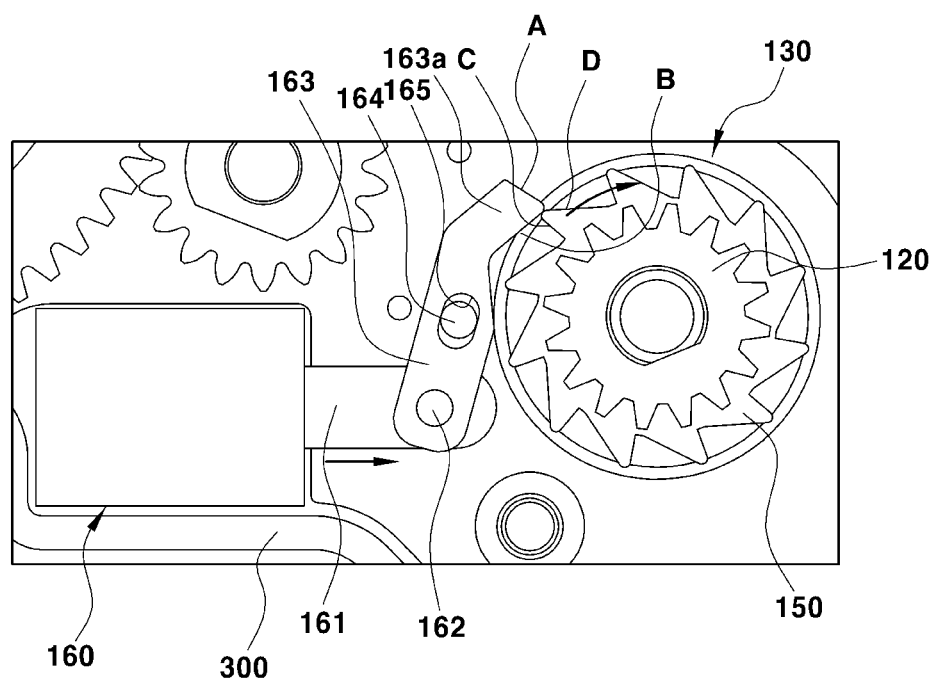
Figure 4C:
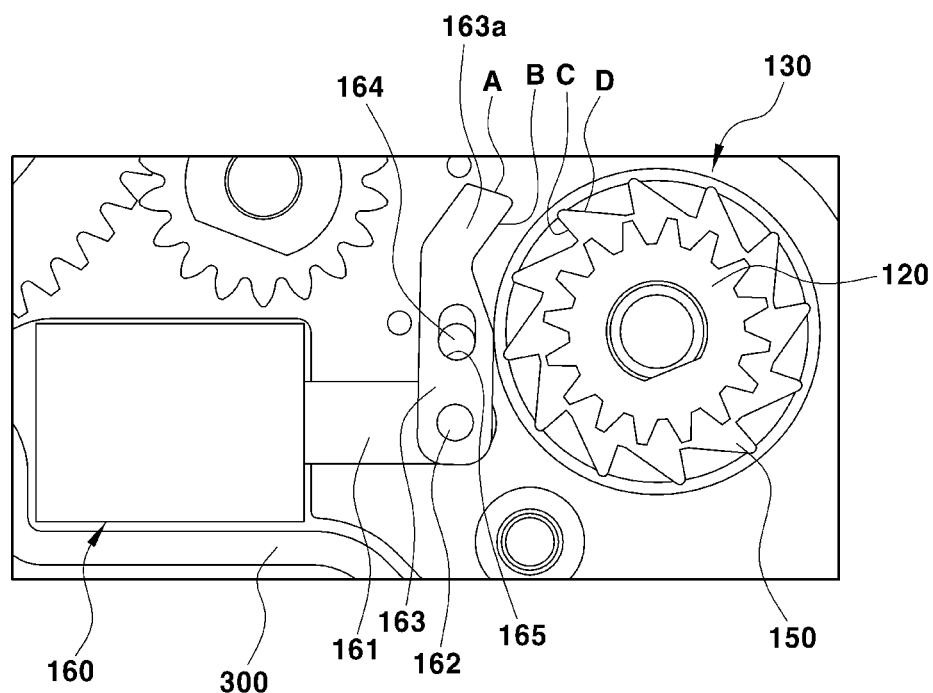

Meanwhile, FIGS. 4A to 4C illustrate the operations at the time of releasing the parking braking.

FIG. 4A illustrates a state in which the parking braking has been performed, and the parking rod 163 restricts the rotation of the parking ring 150 similar to as illustrated in FIG. 3C.

Meanwhile, in a case in which the parking braking is released in accordance with the driver's intention, the control unit 170 operates the motor unit 110 so as to release the parking braking. Specifically, the control unit 170 rotates the motor unit 110 clockwise (i.e., in a direction for pressing the disc). In this case, as illustrated in FIG. 4B, the support surface C of the protrusion, which is in contact with the parking rod 163 among the protrusions of the parking ring 150, is moved away from the parking rod 163, and the pressing surface D of the neighboring protrusion pushes away the lateral surface B of the parking rod 163. In this case, force, which is exerted on the upper end surface A of the parking rod 163, that is, in the releasing direction, is eliminated, and as a result, restoring force of the return spring of the parking drive unit 160 is exerted. As a result, even though the parking drive unit 160 is not separately operated, the parking rod 163 and the driving rod 161 are moved to the releasing positions as illustrated in FIG. 4C.

Therefore, in the case of the electromechanical brake according to the exemplary embodiment of the present invention, it is possible to perform and release the parking braking with only using minimal amount of driving power, and particularly, it is possible to release the braking without separate driving power at the time of releasing the parking braking.

As described above, an example including the motor, the reduction gear unit, the spindle and the like has been described through the exemplary embodiment of the present invention, but the present invention is not limited by this example, and it can be easily understood by those skilled in the art that the present invention may be changed and implemented as other forms including a structure having a combination of the parking ring and the parking rod for performing and releasing parking braking.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An electromechanical brake capable of automatically releasing parking braking, the electromechanical brake comprising:
    a motor unit which rotates a driving shaft;
    a braking unit which produces braking force or cuts off the braking force in accordance with the rotation of the driving shaft;
    a parking drive unit which operates a driving rod;
    a parking rod which is hingedly coupled to the driving rod and has a slot;
    a guide pin which is inserted into the slot of the parking rod and fixed to a housing; and
    a parking ring which is installed on the driving shaft and has catching portions radially formed thereon.

2. The electromechanical brake of claim 1, wherein the catching portions are protrusions formed radially.

3. The electromechanical brake of claim 2, wherein each of the protrusions has a serrated shape having a support surface and a pressing surface, and the pressing surface has a larger area than the support surface.

4. The electromechanical brake of claim 3, wherein the parking rod has an upper end surface which comes into contact with the support surface of the parking ring, and a lateral surface which comes into contact with the pressing surface.

5. The electromechanical brake of claim 4, wherein the parking rod restricts a rotation of the parking ring by being supported by the guide pin in a state in which the support surface of the parking ring is in contact with the upper end surface of the parking rod at the time of performing parking braking.

6. The electromechanical brake of claim 4, wherein the pressing surface pushes away the lateral surface of the parking rod so as to move the parking rod and the driving rod to the releasing positions at the time of releasing parking braking.

7. The electromechanical brake of claim 1, further comprising:
    a control unit which controls the motor unit and the parking drive unit.

8. The electromechanical brake of claim 7, wherein the control unit rotates the motor unit in a releasing direction when the parking drive unit moves the parking rod and the driving rod to braking positions.

9. The electromechanical brake of claim 7, wherein the control unit rotates the motor unit in a pressing direction at the time of releasing parking braking.

10. The electromechanical brake of claim 1, wherein the slot has a track shape.

11. The electromechanical brake of claim 10, wherein the guide pin has a circular cross section, and a width of the slot is set such that the guide pin is not moved in a transverse direction.

12. The electromechanical brake of claim 1, further comprising:
    a return spring which provides restoring force for moving the parking rod and the driving rod to releasing positions at the time of releasing parking braking.

13. The electromechanical brake of claim 12, wherein the return spring is mounted in the parking drive unit.

14. The electromechanical brake of claim 1, wherein the catching portions have the same shape and size.

15. The electromechanical brake of claim 1, wherein the parking rod restricts a rotation of the parking ring by being supported by the guide pin at the time of performing parking braking.

16. The electromechanical brake of claim 1, wherein the parking drive unit is a solenoid which moves the driving rod in a single direction.

17. The electromechanical brake of claim 1, further comprising:
    a driving gear which is installed on the driving shaft; and
    a reduction gear unit which is connected with the driving gear.

18. The electromechanical brake of claim 1, wherein the parking rod, which is moved to the braking position by the parking drive unit, restricts a rotation of the parking ring by coming into contact with the catching portion of the parking ring.

* * * * *